(12) United States Patent
Thomas

(10) Patent No.: US 10,283,949 B2
(45) Date of Patent: May 7, 2019

(54) WEATHER RESISTANT FLOOR BOX WITH DRAINING CHAMBER

(71) Applicant: Hubbell Incorporated, Shelton, CT (US)

(72) Inventor: Jason Thomas, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/682,054

(22) Filed: Aug. 21, 2017

(65) Prior Publication Data

US 2018/0054050 A1 Feb. 22, 2018

Related U.S. Application Data

(60) Provisional application No. 62/377,103, filed on Aug. 19, 2016.

(51) Int. Cl.
*H02G 3/18* (2006.01)
*H02G 3/08* (2006.01)
*E03F 5/04* (2006.01)

(52) U.S. Cl.
CPC ............. *H02G 3/185* (2013.01); *H02G 3/088* (2013.01); *E03F 5/0407* (2013.01)

(58) Field of Classification Search
CPC ........ H02G 3/088; H02G 3/185; E03F 5/0407

USPC ....................................................... 174/50, 58
See application file for complete search history.

(56) References Cited

U.S. PATENT DOCUMENTS

| | | | |
|---|---|---|---|
| 6,610,927 B2 | 8/2003 | Dinh et al. | |
| 7,388,164 B2 | 6/2008 | Scanzillo | |
| 8,013,242 B1 | 9/2011 | Thibault et al. | |
| 8,530,757 B2 | 9/2013 | Dinh | |
| 8,629,349 B2 | 1/2014 | Martino et al. | |
| 9,077,166 B2 * | 7/2015 | Dinh ....................... | H02G 3/088 |
| 2005/0246982 A1 | 11/2005 | MacMillan et al. | |
| 2011/0005799 A1 | 1/2011 | Drane | |
| 2013/0078853 A1 | 3/2013 | Dinh | |
| 2016/0150661 A1 | 5/2016 | Hemingway et al. | |

OTHER PUBLICATIONS

PCT/US2017/047803 International Search Report and Written Opinion dated Nov. 20, 2017 (16 pages).

* cited by examiner

*Primary Examiner* — Dhiru R Patel
(74) *Attorney, Agent, or Firm* — Michael Best & Friedrich, LLP

(57) ABSTRACT

A floor box for accommodating and protecting an electrical device such as a receptacle includes a housing and a cover. The floor box can be placed within a floor or ground. Rain water or other liquids that enter the floor box are isolated from the electrical device within the box and are removed from the interior of the box by a drain.

24 Claims, 7 Drawing Sheets

WEATHER RESISTANT FLOOR BOX WITH DRAINING CHAMBER

CROSS-REFERENCE TO RELATED APPLICATION

This application claims the benefit of prior-filed U.S. Provisional Patent Application No. 62/377,103, filed Aug. 19, 2016, the entire contents of which are incorporated by reference herein.

FIELD

Various exemplary embodiments relate generally to electrical boxes. More particularly, exemplary embodiments relate to electrical boxes for mounting in a floor and/or underground.

BACKGROUND

Electrical boxes are installed in concrete floors to provide outlets for various services, such as electrical power service or low voltage service for telephone and data communications. Typical floor boxes may include a housing with a removable cover to allow access to the interior of the housing. Among other things, a recurring problem with floor mounted electrical boxes is seepage of liquids past the cover and into the housing.

Thus, there is a continuing need to provide electrical boxes which removes liquid from the interior compartment of the housing. Additionally, there is a continuing need to provide electrical boxes that are easily assembled and permit easy access to the wires and other elements contained therein. Embodiments of a floor box consistent with the invention disclosed herein address these needs in the art as well as other needs, which will become apparent to those skilled in the art once given this disclosure.

SUMMARY

In one aspect, an enclosure includes a housing with a first wall and one or more second walls. The second walls extend from the first wall and define an interior space. An upper edge of the second walls defines an opening. A partition wall is attached to the first wall and at least one of the second walls. The partition wall divides the interior space into at least a first compartment and a second compartment. The first compartment is configured to support an electrical device. A channel is positioned proximate the upper edge of the second wall and a cover selectively covers the interior space.

In another aspect, an enclosure includes a housing with a first wall, at least one second wall, and a cover. At least one second wall extends from the first wall and defines an interior space. An edge of the second wall defines an opening to the interior space. A partition wall is coupled to the first wall and at least one of the second walls. The partition wall divides the interior space into at least a first compartment and a second compartment. The first compartment is abreast with the second compartment. A passageway extends through at least one of the housing and the cover. The passageway is in communication with the second compartment and is configured to allow an electrical wire carrying device to pass through. An aperture positioned on the second compartment. The aperture for draining liquid from the housing and extends through at least one of the first wall and one of the at least one second walls.

In yet another aspect, a floor box includes a housing with a first wall, one or more second walls, and a cover. The second walls extend from the first wall and define an interior space. An edge of each of the second walls distal the first wall defines an opening to the interior space. A partition wall coupled to the first wall and at least one of the second walls. The partition wall forms a first compartment and a second compartment positioned abreast of the first compartment. The first compartment and the second compartment are isolated from one another. The first compartment is configured to support an electrical device in communication with an electrical wire carrying device. The cover includes a passage. The cover is coupled to the housing and is movable between a closed position and an open position. The cover is configured to seal the interior space. The passage is in communication with the second compartment when the cover is in the closed position. The passage is configured to receive an electrical wire carrying device extending from the first compartment through the second compartment while the cover is in the closed position.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
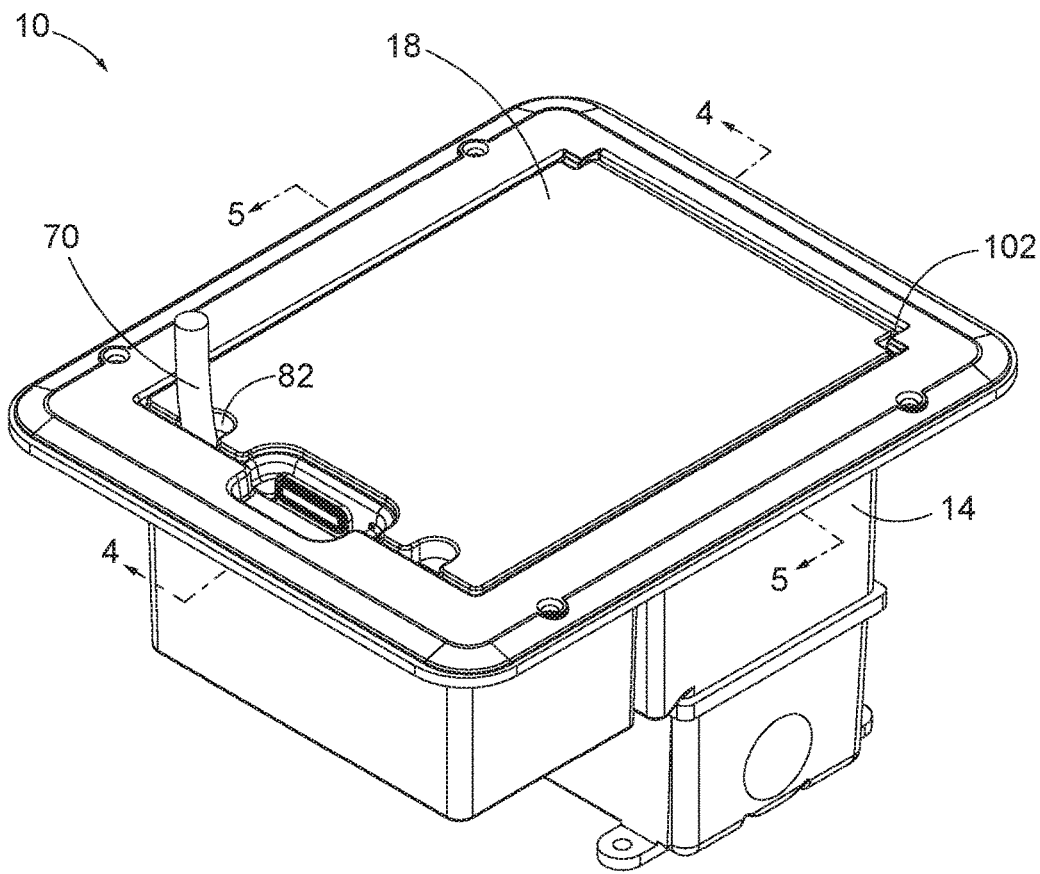
FIG. 1 is a perspective view of a floor box.
Figure 2:
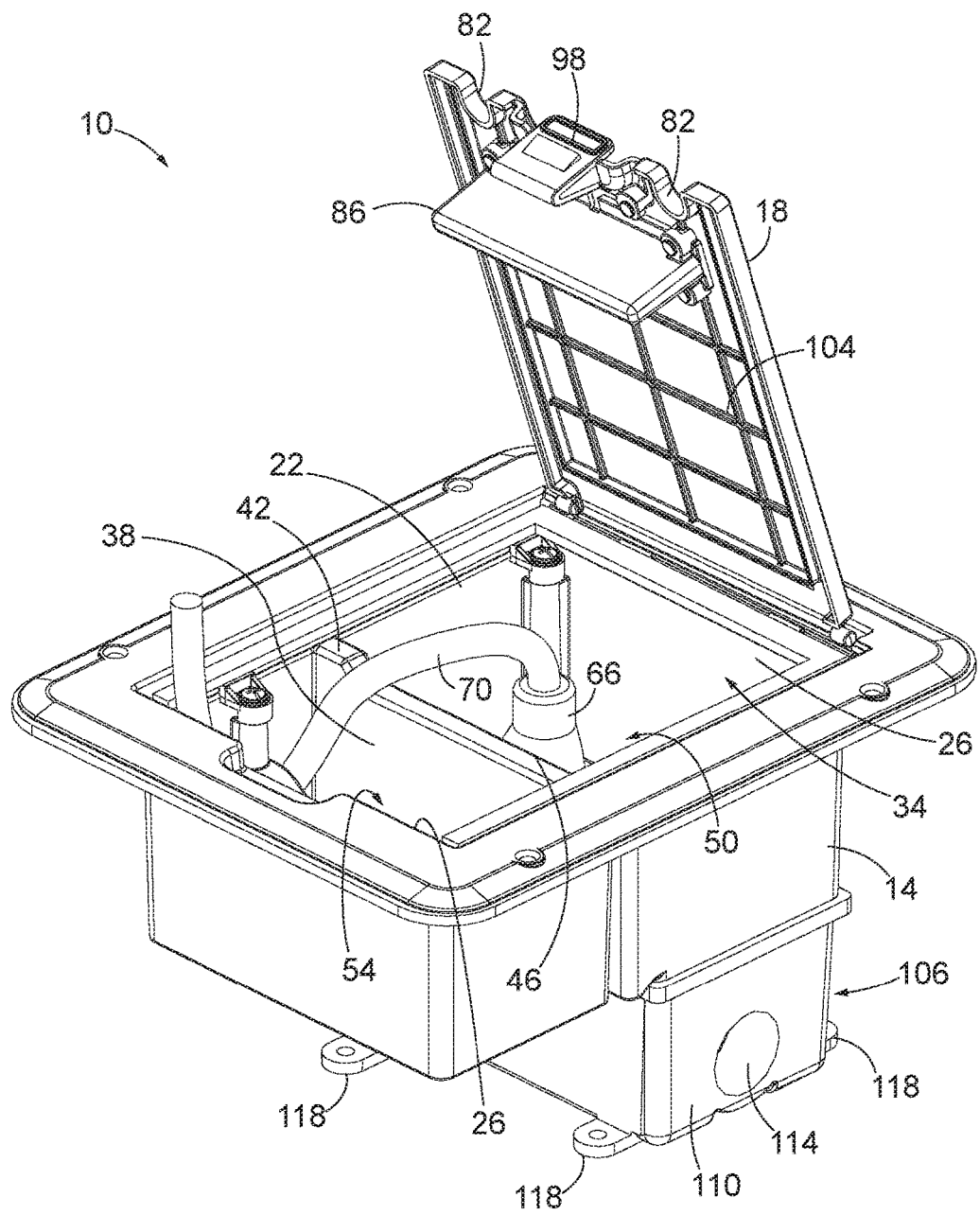
FIG. 2 is a perspective view of a floor box of FIG. 1 with a cover open.
Figure 3:
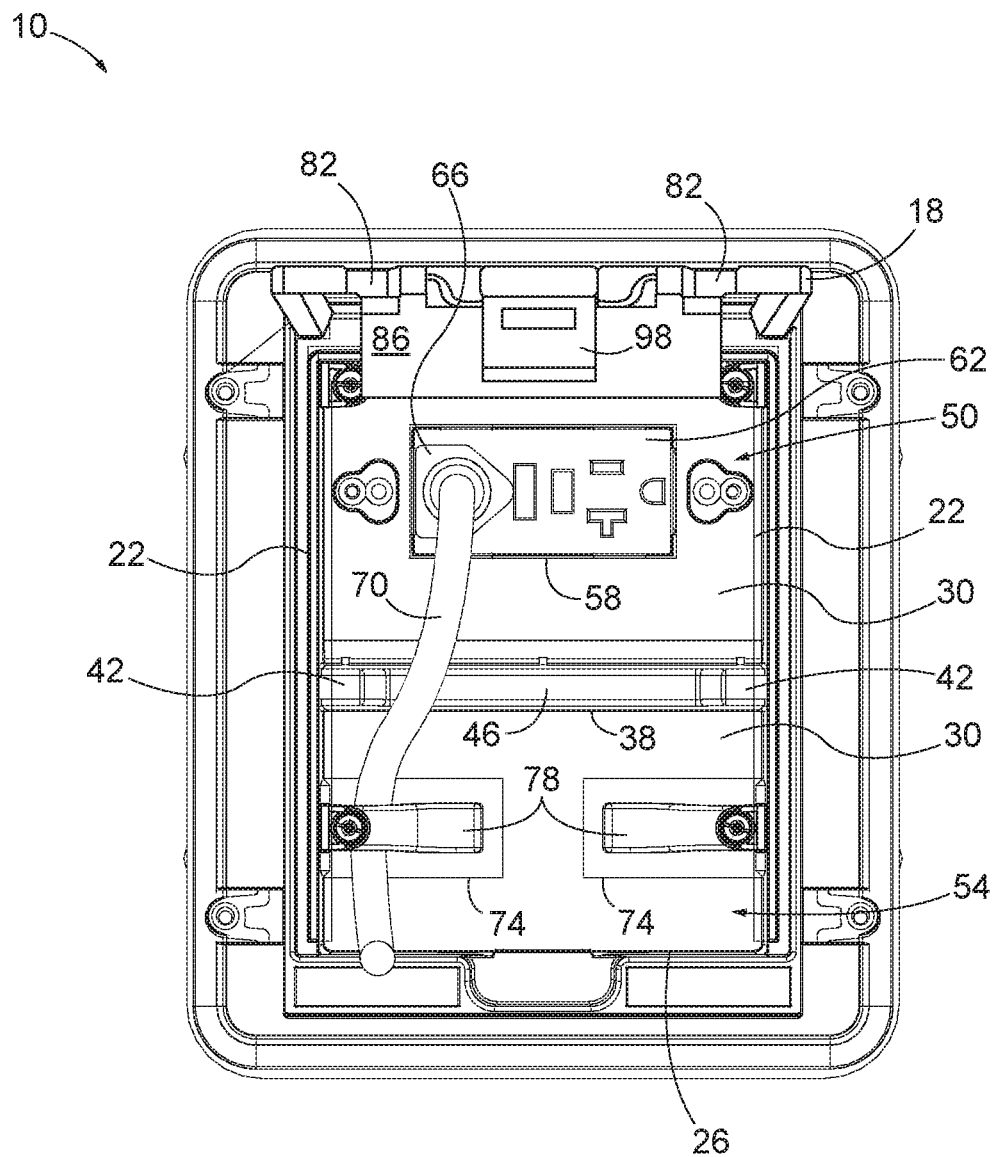
FIG. 3 is a plan view of the floor box of FIG. 1 with the cover open.
Figure 4:
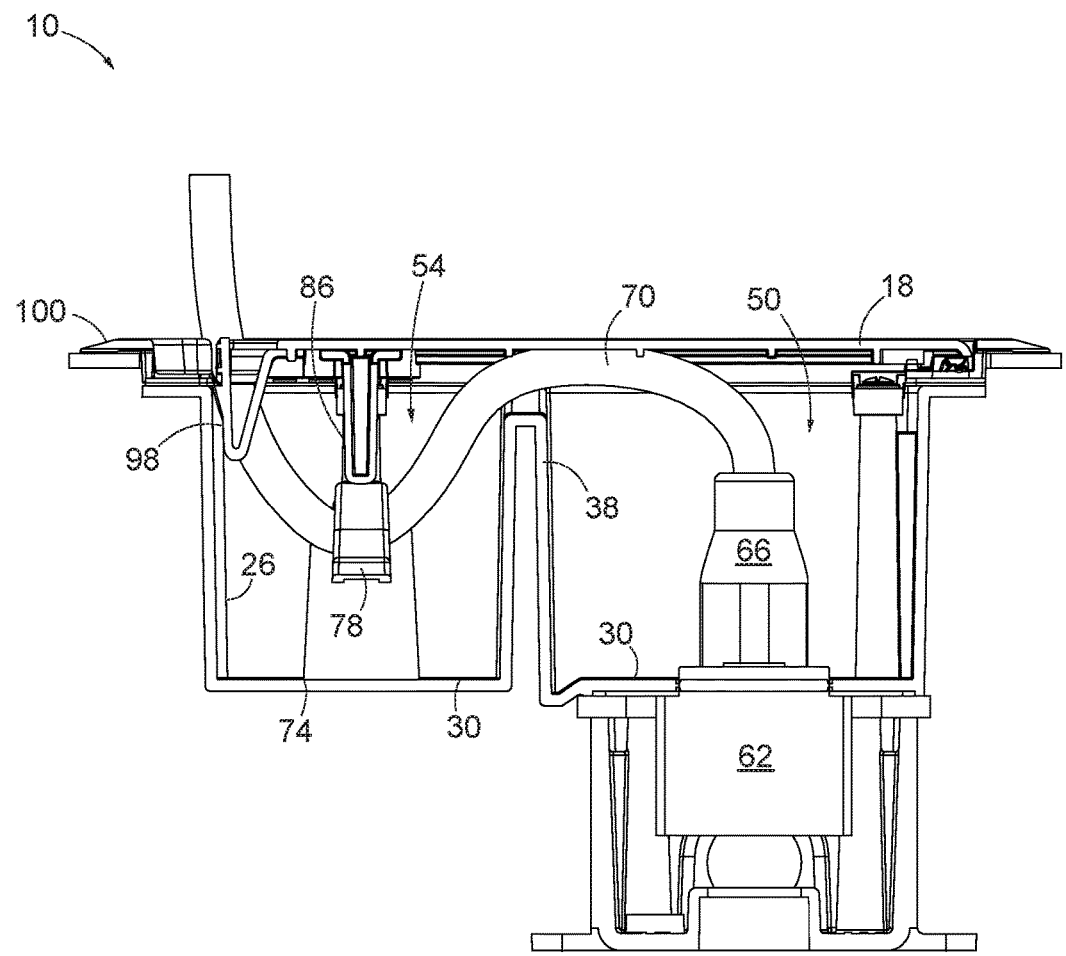
FIG. 4 is a section view of the floor box of FIG. 1 viewed along section 4-4.

FIGS. 1 and 2 illustrate a retaining enclosure or electrical floor box 10. The floor box 10 may be mounted in various applications (e.g., on a deck or other structure). The floor box 10 includes a rectangular housing 14 and a cover 18. As shown in FIGS. 3 and 4, the floor box 10 includes a first or lower wall 30, a pair of second or side walls 22 and a pair of third or end walls 26. The side walls 22 and end walls 26 extend substantially perpendicular from the lower wall 30 and cooperate therewith to define an interior space 34.

A partition wall 38, attached to side walls 22 and the lower wall 30, divides the interior space 34 into first and second compartments 50 and 54, respectively. The partition wall 38 inhibits water or other liquids from entering the first compartment 50 from the second compartment 54. In the illustrated embodiment, the first compartment 50 and the second compartment 54 are positioned in a side-by-side or abreast relationship. Also, in the illustrated embodiment the partition wall 38 includes a first portion 42 and a second portion 46. The second portion 46 can include a groove or other feature such that the second portion 46 has a different height than the first portion 42. A sealing material (e.g., silicone—not shown) can be used to seal spaces between the partition wall 38 and the side walls 22 and the lower wall 30. In some embodiments, guide slots (not shown) in side walls 22 and/or lower wall 30 can be provided to receive the partition wall 38. Also, in other embodiments, the partition wall 38 may be integral with side walls 22 and/or the lower wall 30.

Referring to FIG. 3, the first compartment 50 includes a cutout 58 in the lower wall 30. The cutout 58 may be sized for an electrical outlet or receiving receptacle 62, or another electrical device. The receptacle 62 receives a plug 66 that is attached to a wire carrying device or cord 70 to provide electrical power to a user when the floor box 10 is in use.

As shown in FIG. 4, in the illustrated embodiment, the cord 70 runs over the top of the second portion 46 of the partition 38 to avoid the cover 18 squeezing the cord 70 between an upper edge of the partition wall 38 and a first side or lower surface of the cover 18 when the cover 18 is closed. In other embodiments, the partition wall 24 could include only a single portion having a constant height with an upper edge spaced apart from the cover 18 to permit the cord 70 to extend over the partition wall 38 at any location without being squeezed by the cover 18 when the cover 18 is closed.

Returning to FIG. 3, the second compartment 54 includes one or more apertures 74 to allow liquid that has entered second compartment 54 to drain or exit the interior space 34 into an exterior environment. Apertures 74, in accordance with the embodiment shown, can be located in one or more of the lower wall 30 and/or the end wall 26 located in the second compartment 54. As best shown in FIG. 4, a retaining member or cord retainer 78 is positioned in the second compartment 54 and attached to, or made integral with, one of the side walls 22. The cord 70 extends from receptacle 62 over an upper edge of the partition wall 38 and is retained by the retainer 78. The cord 70 exits the floor box 10 through a hole or passage 82 (FIG. 1). The cover 18 also includes a cover extension member or drip loop wall 86 located on a lower surface of the cover 18.

As shown in FIG. 4, when the cover 18 is closed, the drip loop wall 86 is located in the second compartment 54 above the cord retainer 78. The drip loop wall 86 helps to maintain the cord 70 in a substantially U-shape, which assists in positioning or guiding the cord 70 through the second compartment 54 and into the hole 82 (FIG. 1). In addition, the cord 70 is oriented to inhibit water from traveling along the cord 70 into the second compartment 54.

Figures 5A, 5B:
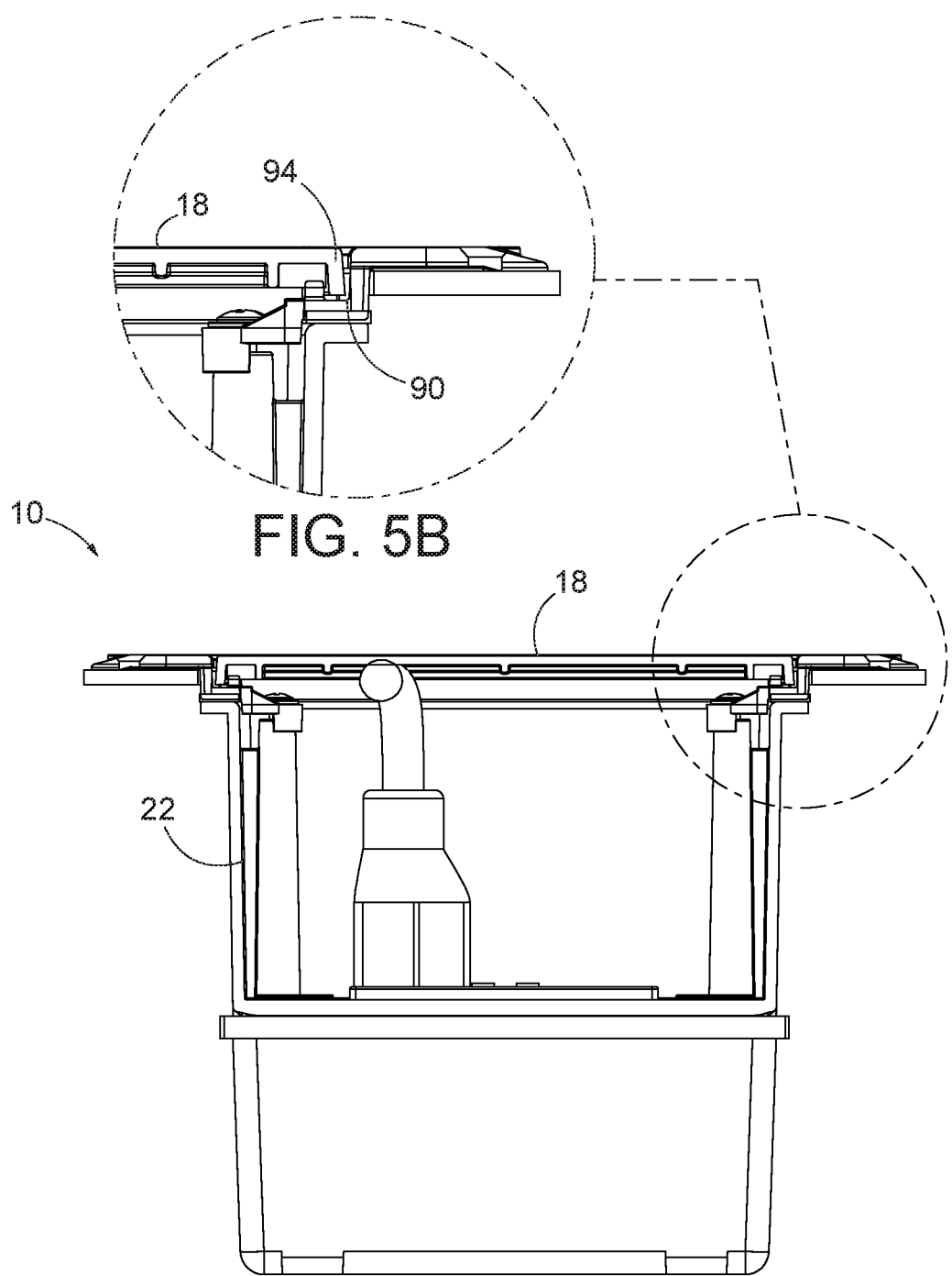
FIG. 5A is a section view of the floor box of FIG. 1 viewed along section 5-5.
FIG. 5B is an enlarged view of the section view of FIG. 5A.

Referring to FIGS. 5A and 5B, housing 14 includes a channel 90 extending along an upper edge of each side wall 22 for directing liquid (e.g., water) toward the second compartment 54. The channel(s) 90 thereby direct liquid away from the receptacle 62 in the first compartment 50 and toward a drain (e.g., the apertures 74).

In the illustrated embodiment, each channel 90 receives one of the protrusions 94 that extend along lower edges of corresponding sides of the cover 18. The protrusions 94 fit within the channels 90 when the cover 18 is closed. In some embodiments, the protrusions 94 fit snugly within channels 90 when the cover 18 is closed to provide a water-tight seal along the sides at the upper edge of floor box 10. In other embodiments, a gasket can be utilized to seal the cover 18 with the housing 14.

Referring again to FIG. 4, a latch 98 secures the cover 18 to the housing 14. In the illustrated embodiment, the latch 98 is positioned on the lower surface of the cover 18, proximate the end wall 26 of the second compartment 54 when the cover 18 is closed. As shown in FIGS. 1 and 2, the cover 18 is attached to the housing 14 by hinges 102 positioned adjacent one of end walls 30, thereby permitting the cover 18 to be opened to provide access to the interior space 34.

In the illustrated embodiment, when the cover 18 is closed (FIG. 1), the top of the cover 18 is flush with the upper surface(s) of the outer edges of housing 14. In addition, an outer edge 100 of the upper portion of the housing 14 is tapered such that when the box 10 is installed within a floor or at ground level, the edges of the floor box 10 are flush. Among other things, the flush relationship avoids posing a tripping hazard and allows wheeled vehicles to pass easily over the floor box 10. In the illustrated embodiment, integral ribs 104 are provided on an underside of the cover 18 to provide additional structural strength allowing foot and/or vehicle traffic to safely pass over the top of floor box 10.

Referring again to FIGS. 2 and 3, the receptacle 62 is secured within protective box 106 (FIG. 2) attached to the underside of the second compartment 54 of housing 14. The protective box 106 includes a punch out 114 in a box side wall 110. The punch out 114 is formed integrally with the protective box 106 and is provided with various gradations to permit a user to remove various sizes of material and create a hole having a desired size in order to accommodate various sizes of electrical conduit or other piping entering the protective box 106 (e.g., to provide electrical wiring to the receptacle 62). Flanges 118 are positioned on each side of the protective box 106. Attachment devices (e.g., fasteners, screws, or bolts—not shown) are used to secure box 106 to the floor or other surface. In other embodiments (not shown), the protective box 106 may not include flanges 118 and may be attached to a surface by other means.

According to the embodiment shown in FIGS. 1-5B, an electrical receptacle can be provided outdoors and protected from environmental conditions, particularly rain. The electrical connection between the plug 66 and the receptacle 62, when the receptacle 62 is in use, is also protected from the environmental conditions. Further, any water, or other liquid, that enters the box, for example, through the holes provided for entry of the power cord 70, is contained within the second compartment 54 and directed out of the housing, substantially isolating the first compartment 50 from any liquid in the housing.

Figure 6:
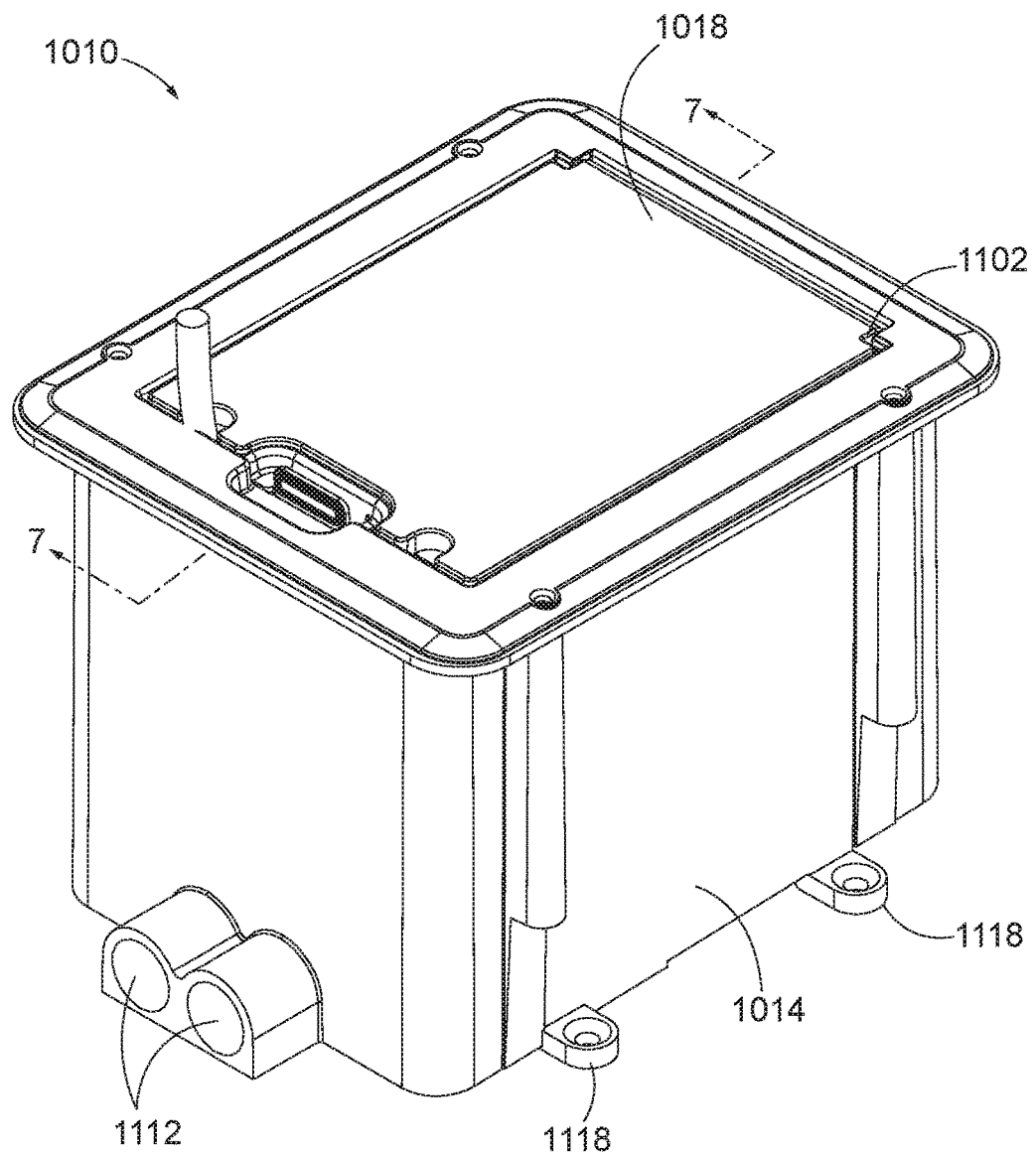
FIG. 6 is a perspective view of a floor box according to another embodiment.
Figure 7:
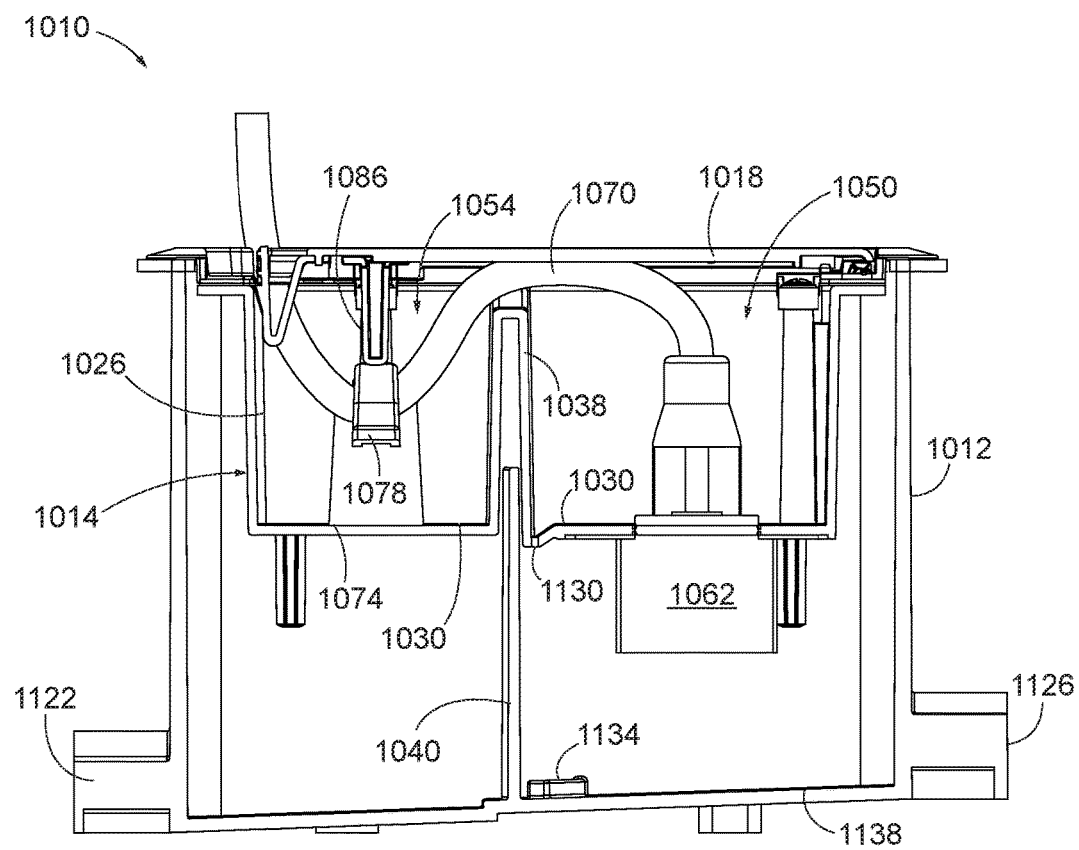
FIG. 7 is a section view of the floor box of FIG. 6 viewed along section 7-7.

FIGS. 6 and 7 show a floor box 1010 according to another embodiment. The floor box 1010 shown in FIGS. 6 and 7 is similar to the floor box 10 described above in regard to FIGS. 1-5B, and only differences will be discussed herein for the sake of brevity. Similar features elements are indicated with the same reference number, plus 1000.

As shown in FIG. 7, the floor box 1010 includes a housing 1014 positioned within a securing box 1012. The securing box 1012 surrounds housing 1014. In the illustrated embodiment, the securing box 1012 completely surrounds the housing 1014. In other embodiments, the securing box 1014 can surround only a part of the housing 1014. Surrounding the housing 1014 protects the housing 1014 while it is secured to the ground. In the illustrated embodiment, the floor box 1010 is intended to be placed in the ground while concrete is poured around it. By enclosing the housing, the securing box 1012 protects the housing 1014 and its components from the concrete. When liquid passes through an aperture 1074 in a lower wall 1030 of the housing 1014, the liquid may be directed through a drain aperture 1122 to a drain conduit (not shown). The securing box 1012 also has a cable aperture 1126 that is configured to accept an electrical wire carrying devices (not shown) from a receptacle or electrical outlet 1062.

In the event that liquid enters a first compartment 1050 of the housing 1014, drain passages 1130 are positioned on the on the lower wall 1030 of the first compartment 1050. These drain passages 1130 allow liquid that has entered the first compartment 1050 to exit and fall to a lower surface 1138 of the securing box 1012. The lower surface 1138 of the securing box 1012 is sloped downwardly towards the drain aperture 1122. In other words, the lower surface 1138 proximate the cable aperture 1126 is on a plane above the lower surface 1138 proximate the drain aperture 1122. From there, the liquid exits the securing box 1012, through a drain provision 1134. In the illustrated embodiment, the drain provision 1134 is located directly below the lower wall 1030 of the first compartment 1050, proximate a partition wall 1038. The partition wall 1038 is positioned over a partition wall 1040 of the securing box 1012. In the illustrated embodiment, the securing box partition wall 1040 nests within the partition wall 1038. This can prevent movement of the housing 1014 with respect to the securing box 1012. The securing box partition 1040 wall can accommodate housings 1014 with different sized partition walls 1038 and can nest with housings 1014 with a deeper or shallower first compartment 1050 or second compartment 1054.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

Although various aspects have been described in detail with reference to certain embodiments, variations and modifications exist within the scope and spirit of one or more independent aspects as described. Various features and advantages are set forth in the following claims.

What is claimed is:

1. An enclosure for providing access to utilities in a floor structure, the enclosure comprising:
    a housing including a first wall and one or more second walls, the second walls extending from the first wall and defining an interior space, an upper edge of the second walls defining an opening;
    a partition wall attached to the first wall and at least one of the second walls, the partition wall dividing the interior space into at least a first compartment and a second compartment, the first compartment supporting an electrical device, the first wall including a cutout and the electrical device positioned within the cutout:
    a retaining member to engage a cord that is to be coupled to the electrical device in the first compartment, the retaining member positioned in the second compartment;
    a channel positioned proximate the upper edge of the second walls; and
    a cover movable between an open position in which the interior space is accessible and a closed position in which the interior space is covered.

2. The floor box of claim 1, further comprising an aperture draining liquid in the second compartment, the aperture extending through at least one of the first wall and the second wall of the second compartment.

3. The floor box of claim 1, wherein the cover includes a passage receiving the cord extending through the second compartment and a ridge for engaging the channel, the cord in communication with the electrical device in the first compartment.

4. The floor box of claim 3, wherein the cover forms a water-tight seal with the housing while the ridge is secured within the channel.

5. The floor box of claim 1, wherein the partition wall includes a lower portion which has a lesser height relative to the first wall than the rest of the partition wall.

6. The floor box of claim 5, wherein the lower portion is configured to allow the electric cord to pass over the lower portion while the cover covers the interior space.

7. The floor box of claim 1, wherein the channel directs liquid into the second compartment.

8. The floor box of claim 1, further comprising a securing box surrounding the first wall and the second walls.

9. The enclosure of claim 1, further comprising an aperture draining liquid in the second compartment, the retaining member coupled to at least one of the second walls and positioned adjacent to the aperture.

10. An enclosure for providing access to utilities in a floor structure, the enclosure comprising:
    a housing including a first wall, at least one second wall, and a cover, the at least one second wall extending from the first wall and defining an interior space, an edge of the at least one second wall defining an opening to the interior space;
    a partition wall coupled to the first wall and at least one of the at least one second wall, the partition wall dividing the interior space into at least a first compartment and a second compartment, the first compartment abreast with the second compartment;
    a passageway extending through at least one of the first wall, the at least one second wall, and the cover, the passageway in communication with the second compartment to allow an electrical wire carrying device to pass through;

an aperture for draining liquid from the housing, the aperture positioned in the second compartment and extending through at least one of the first wall and one of the at least one second walls; and a retaining member positioned in the second compartment to engage and secure a portion of the wire carrying device against movement.

11. The floor box of claim 10, wherein the partition wall includes a lower portion having a lesser height relative to the first wall than the rest of the partition wall.

12. The floor box of claim 11, wherein the partition wall is configured to allow an electrical wire carrying device to pass from the first compartment over the lower portion to the second compartment while the cover is secured to the at least one second wall.

13. The floor box of claim 10, further comprising a cutout on the first wall of the housing inside the first compartment, to support an electrical outlet.

14. The floor box of claim 13, further comprising a protective box coupled to the first wall of the housing to contain the electrical device.

15. The floor box of claim 10 further comprising:

a channel adjacent the edges of the at least one second wall, distal relative to the first wall, the channels to direct liquid to the second compartment;

protrusions connected to the cover, the protrusions selectively received within the channel to secure the cover over the opening of the interior space.

16. The floor box of claim 10, further comprising at least one hinge pivotably coupling the cover to one of the second walls.

17. The floor box of claim 10, further comprising a securing box surrounding the first wall and the second walls.

18. The enclosure of claim 10, wherein the retaining member is coupled to at least one of the second walls and positioned adjacent to the aperture.

19. A floor box for providing access to utilities in a floor structure, the floor box comprising:

a housing including a first wall and one or more second walls, the second walls extending from the first wall and defining an interior space, an edge of each of the second walls distal the first wall defining an opening to the interior space;

a partition wall coupled to the first wall and at least one of the second walls, the partition wall forming a first compartment and a second compartment positioned abreast of the first compartment, the first compartment and the second compartment isolated from one another, the first compartment supporting an electrical device in communication with an electrical wire carrying device;

a cover including a passage, the cover coupled to the housing and movable between a closed position and an open position, the cover configured to seal the interior space, the passage in communication with the second compartment when the cover is in the closed position, the passage receiving an electrical wire carrying device extending from the first compartment through the second compartment while the cover is in the closed position; and a retaining member for a wire carrying device positioned in the second compartment.

20. The floor box of claim 19, an aperture extending through at least one of the first wall and the second wall of the second compartment to provide fluid communication between the interior space of the first compartment and an outside environment.

21. The floor box of claim 20, wherein a liquid that enters the housing through the passage or the aperture is entrained within the second compartment.

22. The floor box of claim 19, wherein the partition wall includes a first height and a second height, the first height to allow an electrical wire carrying device to extend over the first height while the cover is sealed.

23. The floor box of claim 19, further comprising a securing box surrounding the first wall and the second walls.

24. The floor box of claim 19, further comprising an aperture draining liquid in the second compartment, the retaining member coupled to at least one of the second walls and positioned adjacent to the aperture.

* * * * *